Dec. 27, 1960 J. W. BRADBURY 2,966,060
SNAP-ACTION SENSING DEVICE

Filed July 25, 1958 3 Sheets-Sheet 1

INVENTOR.
JAMES W. BRADBURY
BY Toulmin & Toulmin
ATTORNEYS

Dec. 27, 1960   J. W. BRADBURY   2,966,060
SNAP-ACTION SENSING DEVICE

Filed July 25, 1958   3 Sheets-Sheet 2

INVENTOR.
JAMES W. BRADBURY
BY Toulmin & Toulmin
ATTORNEYS

Dec. 27, 1960 J. W. BRADBURY 2,966,060
SNAP-ACTION SENSING DEVICE
Filed July 25, 1958 3 Sheets-Sheet 3

INVENTOR.
JAMES W. BRADBURY
BY Toulmin & Toulmin
ATTORNEYS

United States Patent Office 2,966,060
Patented Dec. 27, 1960

2,966,060

SNAP-ACTION SENSING DEVICE

James W. Bradbury, 220 N. Greenmount Ave., Springfield, Ohio

Filed July 25, 1958, Ser. No. 751,072

9 Claims. (Cl. 73—335)

This invention relates to visual indicators in the nature of tell-tales and is particularly directed to snap-action indicators which exhibit a "no-return" characteristic and which are suitable for the sensing of atmospheric conditions, such as temperature and humidity.

The shipping and storing of many items frequently occasion changes of the atmospheric conditions surrounding the items resulting in deterioration of the goods. Thus, with respect to humidity, rusting of components and molding of materials sufficient to render the items non-useful for their intended purpose may well occur, either under storage situations or in transit. Such items include electronic gear, engine parts, tools and fabrics. Military equipment which is shipped to all parts of the world is particularly subject to damaging attacks by moisture, and expensive precautions are taken to minimize the effects of moisture pickup. Also the detection and anticipation of frost conditions, for example, is an important consideration in many localities.

Color-change indicators have hitherto been suggested for sensing the development of adverse conditions within packaged materials. Such color-change devices are difficult to utilize with accuracy because of the problem of detecting small color changes and also because of the human element involved in the visual inspection of the indicator.

This invention contemplates the provision of a condition indicating device which exhibits a mechanical response upon the occurrence of the condition to be sensed. A novel snap-action component is formed to be sensitive to the condition or conditions to be detected. This component may be such as to detect humidity and temperature changes independently or simultaneously, or separate humidity and temperature indicators employing the same basic snap-action principle may be utilized depending upon requirements.

The construction of the indicator is well adapted for service and embodies desired characteristics of ruggedness, economy of manufacture, and the utilization of relatively few simple and usually small parts readily adapted for assembly in the indicator.

The invention also contemplates the provision of a novel combination of a humidity condition indicator with contained material or material in a mass, the humidity condition of which is to be visually indicated. The indicator is usually so constructed that it is of relatively small size and weight so that it can readily be associated with cartons, boxes, envelopes, and the like.

The invention particularly contemplates the provision of a novel condition sensitive indicator which incorporates a bimetallic element and a humidity sensor in one component of the device.

The invention further contemplates a novel packaging arrangement for the temperature condition indicators whereby the indicators may be stored or shipped in a pre-set condition.

In a preferred embodiment of the invention the indicator for sensing a humidity condition includes a spring-like strip formed of phosphor-bronze, spring brass, or a material having good flexibility and resiliency characteristics; some plastics, for example, would serve the purpose. This spring-like strip is adapted as a signal component, most suitably by bending the strip centrally to form a substantially inverted V. One leg of this strip is retained fixedly while a second leg has a free end portion which is spring-biased into contact with and releasably retained by a suitable keeper component. The second leg of the strip carries on its upper or under side moisture absorbent material, such as blotting paper provided with silica gel.

This structure is mounted within a housing which usually is provided with a zone to which the spring-like strip snaps upon release to indicate the occurrence of the condition for which the strip is pre-set. The housing, when the device is in use, has a suitable opening to expose the absorbent material to the atmosphere, the condition of which is to be sensed.

Pick up of moisture causes the strip to bend away from the keeper component and then the spring tension takes over to cause the device to snap to the housing zone. The apex of the inverted V serves as the signal flag and projects into the housing zone.

In an embodiment suitable for sensing both humidity and temperature the spring-like strip is preferably formed of a bimetal such as a steel-brass combination. Then the free end portion of the leg flexes free of the keeper component as the additive result of moisture pickup and temperature change. Such a device is described more particularly hereinafter with respect to the sensing of frost conditions.

The structure of the invention is sensitive in its response either to humidity or temperature and is suitably formed of such normal size and weight that it may be employed in substantially any locality and exposed to substantially any atmosphere without disturbing the atmosphere itself.

The invention will be more fully understood by reference to the following detailed description and accompanying drawings wherein.

Figure 1:
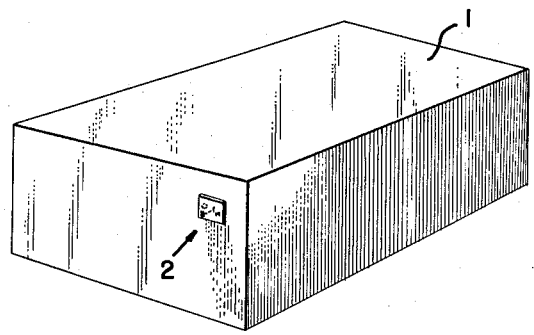
Figure 1 is a perspective view illustrating a carton having an indicator device of the invention secured thereto.

Referring to the drawings, the numeral 1 in Figure 1 designates a carton which has applied thereto, as generally indicated by the numeral 2, a humidity sensing indicator. The indicator 2 comprises a backing 3 suitably of plastic and a closure member 4, also suitably of plastic, and sealed to the backing 3 in any suitable manner.

Figure 3:
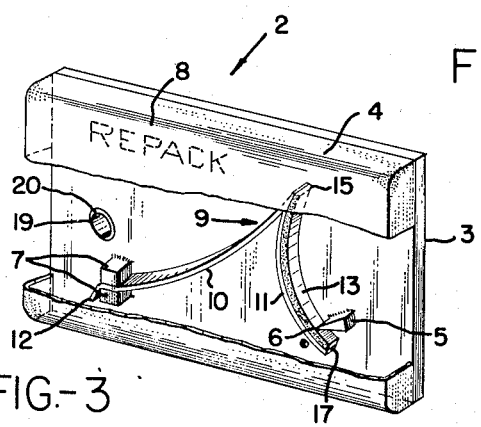
Figure 3 is a somewhat enlarged perspective frontal view illustrating a mechanical arrangement of a humidity sensing indicator in accordance with the invention.

As shown in Figure 3 the backing is provided with a keeper component 5 in the form of a sear molded integral with the backing. The keeper component 5 has a forward knife-like edge 6. The backing 3 is also provided with a pair of studs 7 molded integral with the backing and in slightly spaced apart vertical relation as shown in Figure 3. Additionally the backing 3 is provided with a zone 8 designated in Figure 3 as "repack."

Mounted between the keeper component 5 and the retainer 7 is a strip 9 of Phosphor bronze. This strip 9 has good resilient characteristics, resists corrosion and is entirely suitable for the purpose, although other materials, having similar characteristics, may be employed.

The strip 9 is reversely bent approximately centrally and is somewhat in the shape of an inverted V (Figure 3) having a first leg 10 and a second leg 11. The first leg 10 terminates at an extremity 12 which passes between the studs forming retainer 7 and the leg is downwardly bent to provide for secure holding of the strip 9 by the studs. The leg 11 is provided with an absorbent material 13 in the form of a thin band of blotting paper, for example.

This blotting paper is impregnated with slicia gel or other absorbent. As is known silica gel, when washed and dried to a low water content, that is about 5 percent, is in a highly porous condition, has an enormous surface area suitable for the pickup of moisture. Silica gel tends to retain moisture and to therefore have a somewhat cumulative effect which is desirable in many applications. A non-cumulative absorbent is sodium nitrate.

The band 13 in the embodiment shown in Figure 3 extends from the apex 15 to a free end portion 17 of the leg 11. The strip 9 is biased against its own spring tension in such manner that the free end portion 17 of the leg 11 engages against the knife-like edge 6 of the keeper component 5 and is retained thereby.

Figure 4:
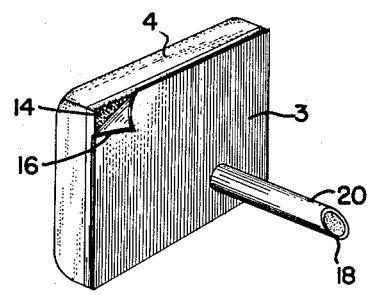
Figure 4 is a rearward perspective view of a structure such as that of Figure 3 but somewhat smaller.

Suitably the backing 3 is provided with an aperture 19 through which a probe 20 in the form of a small tube—about ⅜ inch diameter would be usual for application to a carton—extends rearwardly of the backing as shown more clearly in Figure 4, and terminates in a piercing end portion 18.

Figure 2:
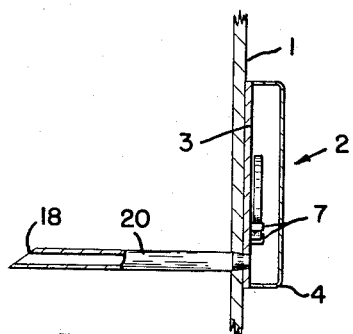
Figure 2 is a side elevational and fragmentary view, partially in section, illustrating an indicator such as that of Figure 1 secured to a carton and with a probe extending into the carton.

As will be noted from Figure 4 also the backing may be suitably provided with an adhesive indicated at 14 over which, for storage and shipping purposes, there is applied a non-adhesive paper 16. The paper 16 for use of the indicator device may be stripped from the adhesive and the probe forced through a carton as indicated in Figure 2 in such manner that the adhesive 14 will contact the carton and secure the instrument rigidly to the carton.

As will be apparent from the foregoing description the atmosphere within the housing formed by the base 3 and closure 4 will communicate with the atomsphere within a container to which the indicator is secured. In the presence of moisture the absorbent material 13 will tend to take up the moisture and the leg 11 will become weighted thereby. The leg 11 will tend to release from the keeper component 5. Upon such release, since the strip 9 has been pre-tensioned in contact with the keeper component, the strip will, under the influence of the tensioning, snap to the zone 8 indicated as "repack." The point of release of the leg 11 from the keeper component 5 is readily preselected and adjusted; for example, the physical dimensions of the band 13 determines the maximum quantity of moisture which the band may pick up. Also the pre-tensioning of the strip 9 in contact with the keeper component 5 will determine the force which may be applied by the moisture picked up to release the extremity 17 from the keeper component 5.

Accordingly it may be readily seen a wide range of humidity conditions may be sensed by the snap-action indicator, and the conditions to be sensed accurately predetermined.

Figure 5:
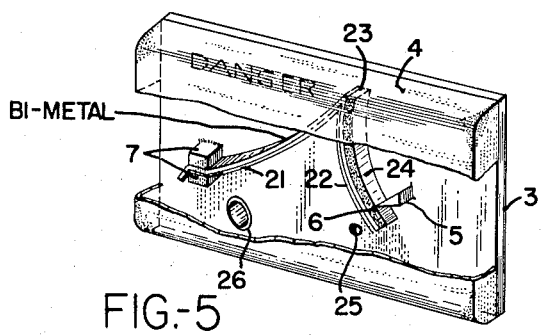
Figure 5 is a view similar to that of Figure 3 but wherein the sensing element of the indicator includes a bimetal.

Referring now to Figure 5 the condition indicator therein is provided, like the prior described indicators, with a backing 3, closure 4, keeper component 5 and a retainer 7. In this instance, however, the spring strip is a bimetallic element, such as a steel-brass combination, having a characteristic of differential elongation with temperature change to provide for flexure of the free end portion of the bimetal away from the keeper component 5.

The bimetal strip is comprised of legs 21, 22 having an apex 23 similar to that of the apex 15 in Figure 3. Absorbent material 24 is also similar to that of the absorbent material of Figure 3 and extends from the apex to the free end portion of the leg 22.

It is to be noted in connection with the absorbent material that while it is shown in the drawings as appearing on the upper side of the leg having the free end portion, the absorbent material could equally well be placed upon the under side of such leg.

The numeral 25 in Figure 5 designates a small aperture, the purpose of which will be referred to hereinafter in connection with Figure 12. The numeral 26 indicates a probe provided in the base 3. In connection with the probes, such as shown at 20 in Figure 4 and at 26 in Figure 5, it is to be noted that they may be of any suitable tubular form and legnth and may pass through the carton, box or other container in any convenient manner. Further, the probe may be formed to itself pierce the base of the indicator and to be assembled with the indicator just before application to a carton.

In the structure of Figure 5, it is the additive result of the weight of the moisture picked up by the absorbent material 24 and the change in length of the bimetal which occasions the release of the leg 22 and the absorbent material 24 from the keeper component 5. Such an arrangement is particularly adapted for sensing a dew point point or for sensing a frost condition.

The bimetal may be selected to release at a low temperature, that is, with a temperature drop, and for this purpose the bimetal would be constituted by a low expansion metal on its upper side and a high expansion metal on its under side. Such bimetal would be selected to provide for a considerable flexure at a temperature of about 33 to 34° F. and to tend to bend away from the keeper component 5. The absorbent material would be provided such that the weight of the moisture pickup, when combined with the flexing of the bimetal, would release the leg 22 from the keeper component 5. Usually this moisture pickup would be the minimum moisture condition at which frost could form at the freezing temperature. Preferably the device is so set that the approaching frost condition would be indicated rather than the frost condition itself, in order that the user of the device might have sufficient warning to take the precautionary measures with respect to crops and the like.

Figure 12:
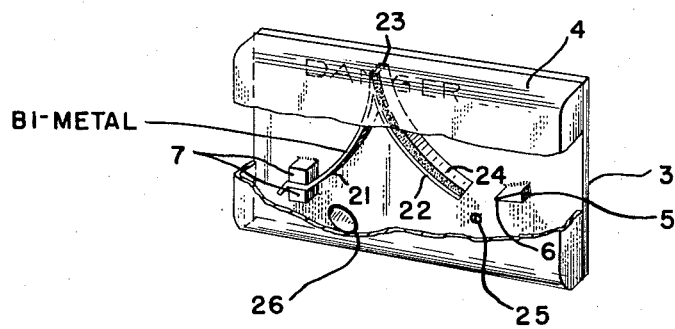
Figure 12 is a perspective view similar to that of Figure 5 but with the device in an actuated condition.

Figure 12 illustrates the bimetal in the released condition, and as may be readily noted the bimetal snaps well into the "danger" zone of the housing.

Figure 6:
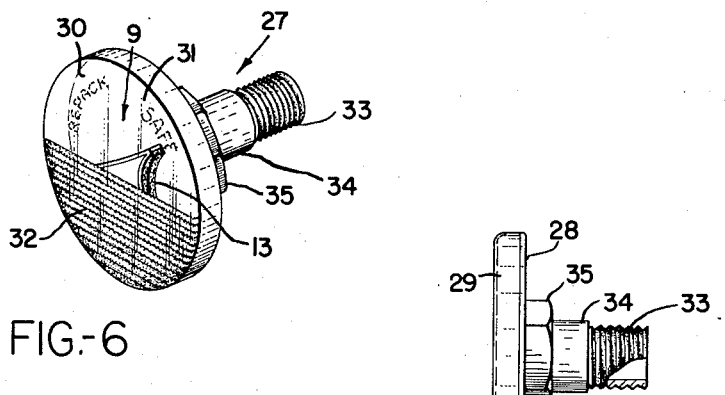
Figure 6 is a perspective view illustrating one form of the condition indicator for combination with a container having a screw thread.
Figure 7:
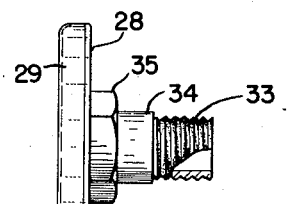
Figure 7 is a side elevational view, with parts broken away, of the structure of Figure 6.

In Figures 6 and 7 there is shown an arrangement of the humidity indicator which is particularly suitable for screw threading into a container. The indicator designated generally at 27 has a base 28 and a closure 29, which together form a housing having a "repack" zone 30 and a "safe" zone 31.

As shown in Figure 6 the indicator is not actuated and accordingly projects into the "safe" zone. Suitably the housing may have an opaque portion 32. Rearwardly a threaded stud 33 is provided with a shoulder 34 and a nut 35 to facilitate mounting of the indicator device on a container. Suitably the nut 35 abuts the other side of the container and the threaded stud 33 is provided with a similar nut on the inner portion of the container to hold the indicator in place.

It will be noted that the stud 33 is hollow so that the atmosphere of the container and the atmosphere within the housing formed by the base 28 and the closure 29 would be similar, and the indicator device would accurately reflect the condition of the atmosphere within the container.

Figure 8:
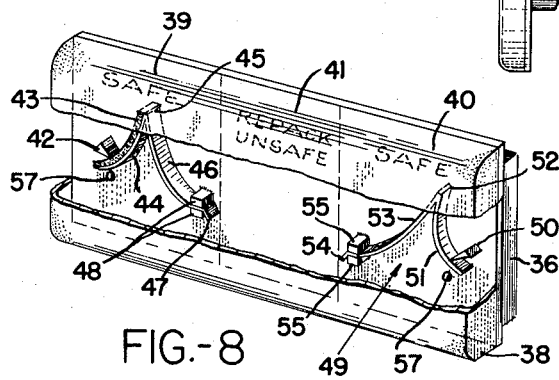
Figure 8 is a perspective view of a dual unit which is adapted for sensing temperature and humidity independently.

Referring now to Figure 8 there is shown therein a dual unit which is adapted for the sensing of humidity and temperature independently. Thus a longitudinal base 36 has a closure 38 sealed to the base, and a housing formed by the combination of base and closure is provided with "safe" zones 39, 40 and an "unsafe" zone 41, as clearly shown in the drawings.

At its leftward end the base is provided with a keeper component 42. An absorbent material 43, such as already described, is provided on a leg 44 of a strip of spring brass, which has an apex 45; the leg 46 terminates in an extremity 47 and is fixedly held by a retainer in the form of molded studs 48 on the backing. It is to be noted that the extension of the free end portion of the spring biased strip beyond the sear or keeper component is effective to control the release of the free end portion from the keeper component.

At its rightward end the backing is provided with a similar keeper component 50 against which an end portion of leg 51 is resiliently urged.

The strip having the legs 51, 53 and the apex 52 is a bimetallic element 49, the free end of which flexes away from the keeper component with temperature change. The extremity of the leg 53 indicated at 54 is securely held by a retainer in the form of studs 55, similar to those described in connection with Figure 3.

The structure of Figure 8 may be conveniently mounted to a carton 56 through an aperture of the carton and is suitably adhesively sealed to the carton.

Figures 9, 10:
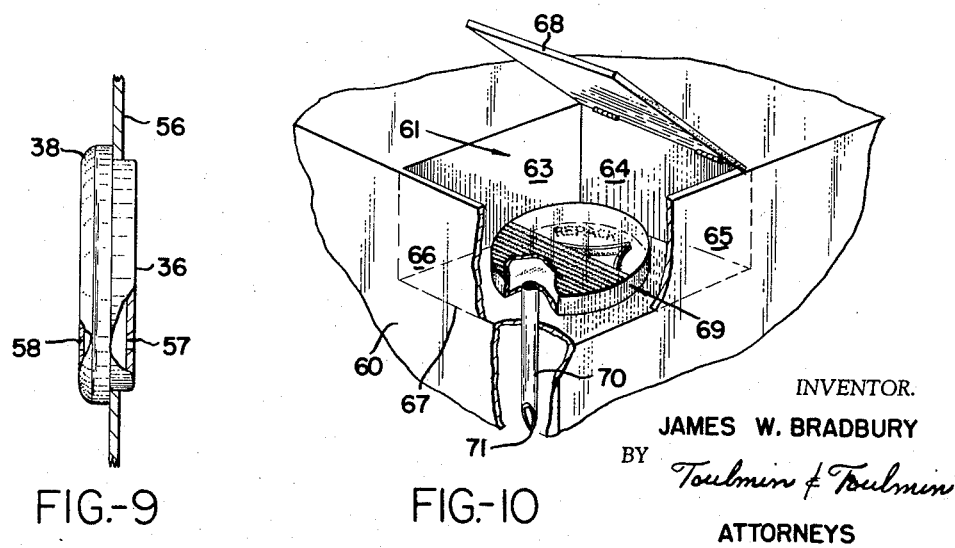
Figure 9 is a fragmentary and side elevational view, with parts broken away, of the structure of Figure 8.
Figure 10 illustrates a condition indicator of the invention mounted within a compartment of a container for sensing the condition of the interior of the container.

As shown in Figures 8 and 9 an opening 57 is conveniently provided in the backing, and the closure 38 is provided with a similar aperture designated at 58; reference to these apertures will be made hereinafter.

The device of Figures 8 and 9 could, of course, be provided with probes, such as already indicated hereinbefore. However, it is to be noted that the housing formed by the base 36 and closure 38 is completely open from the humidity sensing device to the temperature sensing device, and both devices would be exposed to the same conditions within the housing. Accordingly each would independently indicate a condition. Such is a desirable arrangement in situations where either factor alone would be detrimental to the condition of material or equipment.

Referring now to Figure 10, another mode of mounting the indicator device is illustrated, the numeral 60 designating a container having a compartment 61 provided with walls 63, 64, 65, 66, a bottom 67 and a hinged cover 68. In this embodiment the indicator generally designated at 69 is provided with a probe 70 having a tapered end portion 71 and the probe extends from the compartment 61 into the interior of the container to thereby communicate the atmosphere of the interior with the atmosphere of the indicator. Such an arrangement provides for the facile sensing of the condition of the atmosphere within the container.

Figure 11:
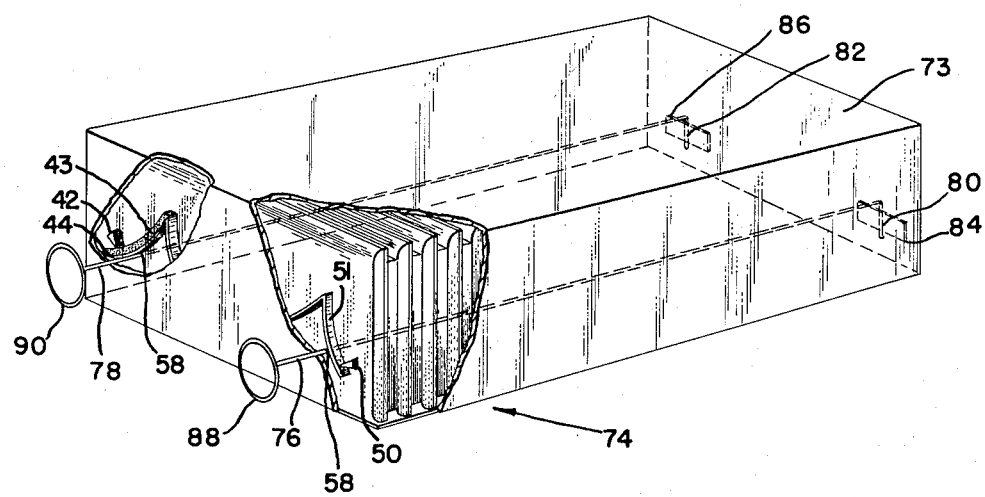
Figure 11 is a perspective view with parts broken away illustrating a plurality of the condition indicators in a retained condition ready for shipment.

Usually the condition indicator devices of the invention, whether they be humidity sensing devices or temperature sensing devices, will be packaged for storage and shipment in a pre-set condition. For this purpose, as shown in Figure 11, a plurality of the dual units, such as illustrated in Figure 8, are suitably packed in side by side relation within a carton 73, as generally indicated at 74.

The numeral 76 indicates a length of relatively rigid wire which extends through the apertures 58 and the openings 57 (Figure 9) of each of the stacked indicators. The wire 76 is in contact with the bimetallic element 49 closely adjacent the free end portion of the leg 51, and serves to retain the leg 51 in contact with the keeper 50.

A similar wire 78 extends through the apertures 58 beneath the legs 44 of the humidity sensing device and serves to retain the humidity sensor positioned on the keeper 42.

Rearwardly the wires 76, 78 terminate, respectively, in downwardly bent portions 80, 82 on the outer side of the carton 73 and are retained in position by strips of adhesive 84, 86, respectively. Forwardly the wires 76, 78 terminate in finger rings 88, 90.

Accordingly the carton 73 may be conveniently shipped or stored with the indicator devices in their pre-set condition. When it is desired to utilize the dual indicator it is removed from the carton in an atmosphere such that the devices will remain pre-set. For example, if the bimetallic leg 51 is pre-set to be actuated on a temperature rise to about 33–34° F., the bimetallic leg should have its retaining wire 76 removed at a somewhat lower temperature, that is 18–20° F. If the indicator is to sense a temperature drop as in Figures 5 and 12, the wire would be removed at a higher temperature than that to be sensed. Similarly, with respect to the humidity sensor, the wire 78 should be removed under an atmospheric condition in which the humidity condition sensor is not so weighted with moisture that the device will snap.

The openings or apertures which receive the wires 76, 78, for example, need only be very small, that is, about 1/32 of an inch in diameter. These apertures may suitably be sealed with a drop of wax or a small piece of adhesive tape to form most accurate sensing. The opening of the humidity condition indicator may be formed in the housing in any desired manner, but preferably is at least about 3/8 inch diameter. When an indicator is once applied to a carton the detection of the removal of the indicator would, of course, be apparent due to the presence of the carton opening.

With respect to the formation of the strip 9, whether of spring metal or of bimetal having spring characteristics, it is to be noted that the leg formation, that is, the generally triangular structure, contributes materially to the rigidity of the device, providing good resistance to any mechanical shock in handling of the indicator itself.

Also, it is to be particularly noted that since the retainer as at 7 in Figure 3 serves as a pivot about which the spring-loaded signal component swings, accordingly a considerable amplification of movement is achieved. This is attained because the movement of the free end portion of the spring-loaded component need be only very slight in order to provide, with the spring reaction, a very considerable movement of the signal flag as at 15 in Figure 3.

The designation of the zones as danger, repack, unsafe and so forth, may, of course, be provided in a number of ways, that is, on the backing, on the closure member, on separate cards, and the like. Also the device itself could be provided on the closure member, or the backing, or on a separate panel.

Further, the housing formed by the backing and closure may be fully transparent or of only sufficient transparency to permit visual inspection of the indicator.

In general, the spring-tensioned component, since it is intended as a one-shot indicator, need not have a long resilient life, but preferably the component should not be stressed beyond its elastic limits in the application.

It will be understood that this invention is susceptible to modification in order to adapt it to different usages and conditions and accordingly, it is desired to comprehend such modifications within this invention as may fall within the scope of the appended claims.

What is claimed is:

1. A snap-action condition indicating device comprising a backing, a keeper component fixed on the backing, a retainer also fixed on the backing and located opposite the keeper component, a condition-sensitive component in the form of a strip having end portions, an intermediate portion and inherent resiliency, the strip being reversely bent between the end portions to provide the intermediate portion as a signal flag, one end portion of the strip being secured to the retainer and the other end portion being free and releasably engageable by the keeper component, said keeper component being positioned to bias the free end portion towards the secured end portion against the inherent resiliency of the strip, and a zone of said indicating device to which said intermediate portion of the strip is influenced by release of the free end portion of the strip from the keeper component.

2. A snap-action humidity condition indicator comprising a housing having a backing, a spring-action component in the housing and in the form of a reversely bent strip thereby providing legs of the component between an intermediate portion of the strip and end portions of the strip, a retainer in the housing on the backing fixedly securing one end portion of the strip, the other said end portion being free, a keeper component located on the backing in the housing in opposed relation to the retainer and releasably engageable with the other free end portion of the strip to bias the free end portion towards the retainer, moisture absorbent material on the leg between the free end portion and the intermediate portion whereby pick-up of moisture by the said material tends to urge the free end portion free of said keeper component, and a zone of said housing to which the intermediate portion of said strip is influenced with release of the said free end portion of the strip.

3. A snap-action condition indicating device for a humidity indication, comprising, a housing having a closure and a backing, a keeper component fixed on the backing, a retainer also fixed on the backing and located opposite the keeper component, a condition-sensitive component in the form of a strip having end portions, an intermediate portion and inherent resiliency, the strip being reversely bent to provide legs of the strip between the intermediate portion and the end portions, said intermediate portion serving as a signal flag, one end portion of the strip being secured to the retainer and the other end portion being free and releasably engageable by the keeper component, said keeper component being positioned to bias the free end portion towards the other end portion against the inherent resiliency of the strip, a zone of said housing to which said intermediate portion of the strip is influenced by release of the free end portion from the keeper component, and said condition-sensitive element including moisture absorbent material on the leg between the intermediate portion and the said free end portion whereby moisture pickup tends to cause said free end portion to flex free of said keeper component.

4. A snap-action combination condition indicator, comprising a housing having a backing, a spring-action component in the housing and in the form of a reversely bent bimetallic strip thereby providing legs of the component between an intermediate portion and end portions of the strip, said strip having an inherent resiliency, a retainer in the housing on the backing fixedly securing one end portion of the strip, the other end portion being free, a keeper component located on the backing in the housing in opposed relation to the retainer and releasably engageable with the free end portion of the strip to bias the free end portion against the inherent resiliency of the strip towards the retainer, moisture absorbent material on the leg between the free end portion and the intermediate portion, and a zone of said housing to which the intermediate portion of said strip is influenced with release of said free end portion of the strip.

5. A snap-action condition indicator, comprising in combination, a condition sensitive strip having an intermediate portion, two end portions and an inherent resiliency, said strip being reversely bent substantially centrally to form legs between the intermediate portion and each of the end portions, a retainer securing one end portion, a keeper component in the form of a sear releasably engaging the other end portion, said other end portion extending beyond the sear away from the retainer, a moisture absorbent material extending over the leg between the intermediate portion and said other end portion, a backing supporting the retainer and keeper component, a closure over the backing and strip enclosing the keeper component and retainer and forming with the backing a housing, a probe extending from the housing communicating the interior of the housing with the exterior, said keeper component being located with relation to said retainer to bias said strip against the inherent resilience of the strip, and a zone of said housing to which said intermediate portion is influenced by release of said other end portion.

6. A snap-action condition indicator as claimed in claim 5 in which the probe has a piercing end portion.

7. A snap-action condition indicator as claimed in claim 5 in which the probe has a screw threaded tubular portion.

8. A snap-action condition indicator as claimed in claim 5 in which the outer side of the backing is provided with a pressure sensitive adhesive for securing the indicator to a container.

9. For combination with a container of material, a humidity condition indicator having a snap-action humidity sensitive device and adapted for communication with the material and interior of a container, a housing enclosing said humidity sensitive devce and said housing having a zone representative of a humidity condition, said snap-action humidity sensitive device comprising a pre-set spring-loaded signal component which is releasable into the zone of the housing upon occurrence of a predetermined humidity condition, and said device thereby serving as a one-shot indicator.

References Cited in the file of this patent
UNITED STATES PATENTS

| | | |
|---|---|---|
| 1,695,103 | Hook | Dec. 11, 1928 |
| 2,046,187 | Saul | June 30, 1936 |
| 2,267,164 | Newton | Dec. 23, 1941 |
| 2,389,358 | Gross | Nov. 20, 1945 |
| 2,874,571 | Hevener | Feb. 27, 1959 |